Aug. 3, 1954 D. L. BEASLEY 2,685,450
TRACTOR FRONT END ELEVATING DEVICE
Filed Jan. 7, 1952 2 Sheets-Sheet 2

INVENTOR.
DON L. BEASLEY
BY
ATTORNEY

Patented Aug. 3, 1954

2,685,450

UNITED STATES PATENT OFFICE 2,685,450

TRACTOR FRONT END ELEVATING DEVICE

Don L. Beasley, Des Moines, Iowa, assignor, by mesne assignments, to Wood Bros., Inc., Dearborn, Mich., a corporation of Delaware Application January 7, 1952, Serial No. 265,347

1 Claim. (Cl. 280—92)

The present invention relates to a tractor front elevating device and more particularly to a wheel assembly for a tractor effective to both steer the tractor and elevate the tractor end to which the wheel assembly is attached.

In the mounting of implements on farm tractors, considerable difficulty is encountered in accurately controlling the vertical positioning of the implement relative to the ground. Particularly is this true in connection with tractors normally provided with rearwardly located, hydraulically actuated and controlled hitch linkages adapted primarily for use with trailing implements. Numerous attempts have been made to control the positioning of front mounted implements by said hydraulic means including the use of complicated tractor-mounted subframes or the like and the use of separate hydraulic actuating means, but either of these expedients requires the pivotable mounting of the implement upon the tractor.

The present invention now provides an improved means for controlling the vertical positioning of tractor-mounted, forwardly located implements wherein the implement may, if desired, be rigidly mounted on the tractor to eliminate the heretofore necessary and cumbersome implement mounting means. The present invention accomplishes this result by providing a steerable tractor front wheel mounted for vertical movement relative to the tractor, as for example, on the actuating rod of an hydraulic cylinder actuable by means of a conventional tractor-mounted hydraulic system. The tractor steering mechanism is desirably connected directly to the cylinder actuating rod so as to rotate the rod in response to steering movement, while actuation of the cylinder piston varies the distance of the tractor front end from the ground. Since the piston cylinder is rigidly mounted on the tractor frame, elevation and lowering of the cylinder actuated rod pivots the tractor frame about the tractor rear axle.

It is, therefore, an important object of the present invention to provide an improved front wheel assembly for a tractor having a steerable and vertically movable front wheel for varying the position of the tractor front end with respect to the ground.

Another important object is the provision of an improved tractor front end elevating device including a steerable front wheel adapted for power actuation to elevate and lower the tractor front end and an implement mounted thereon.

A further object is to provide a front end assembly for a tractor having a steerable tractor-supporting wheel carried by an actuating means rigid with the tractor and power actuatable to raise and lower the tractor front end about the tractor rear axle.

Still another important object is the provision of a tractor elevating and steering assembly including an hydraulic cylinder rigidly mounted at one end of the tractor and having an actuating rod carrying at its lower end a tractor wheel, the wheel being steerable to guide the tractor and relatively movable with respect to the tractor upon actuation of the hydraulic cylinder to elevate and lower the tractor end and an implement carried thereby.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

Figure 1:
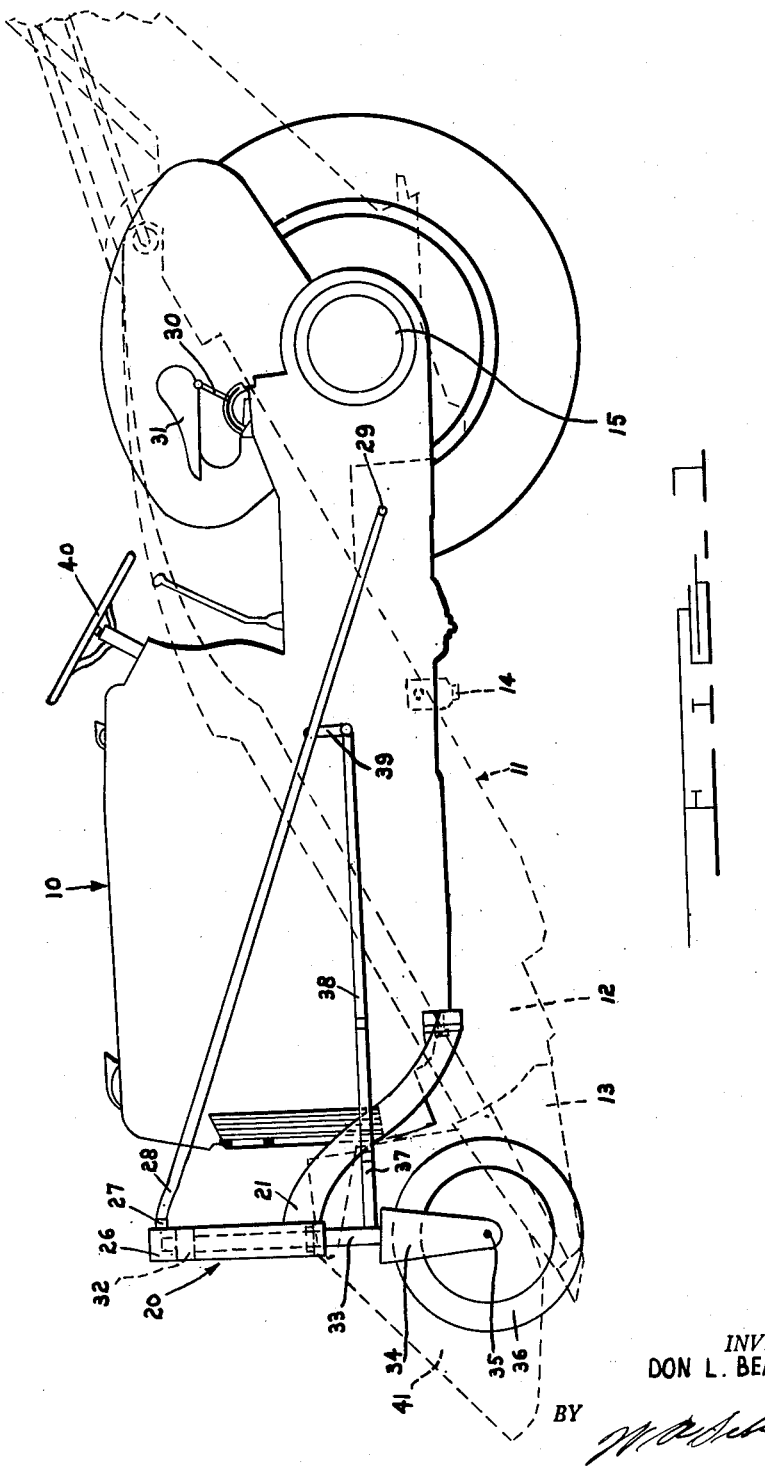
Figure 1 is a side elevational view of a tractor provided with a front end elevating device of the present invention and carrying a forwardly mounted implement indicated in dotted outline.
Figure 2:
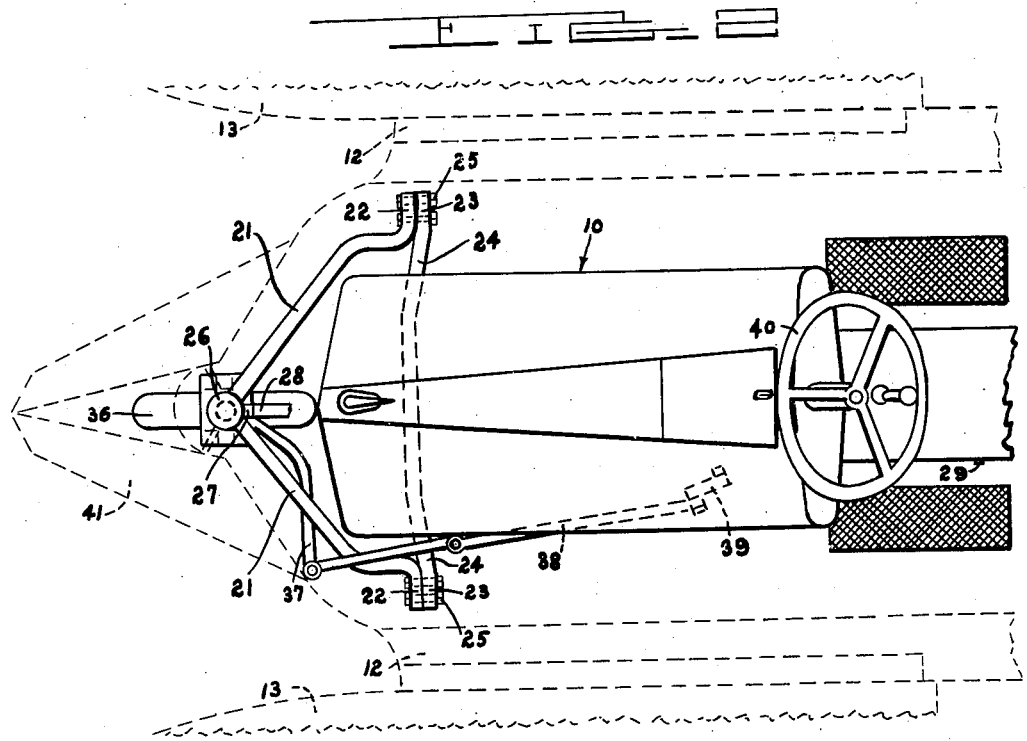
Figure 2 is a fragmentary plan view of the tractor of Figure 1.
Figure 3:
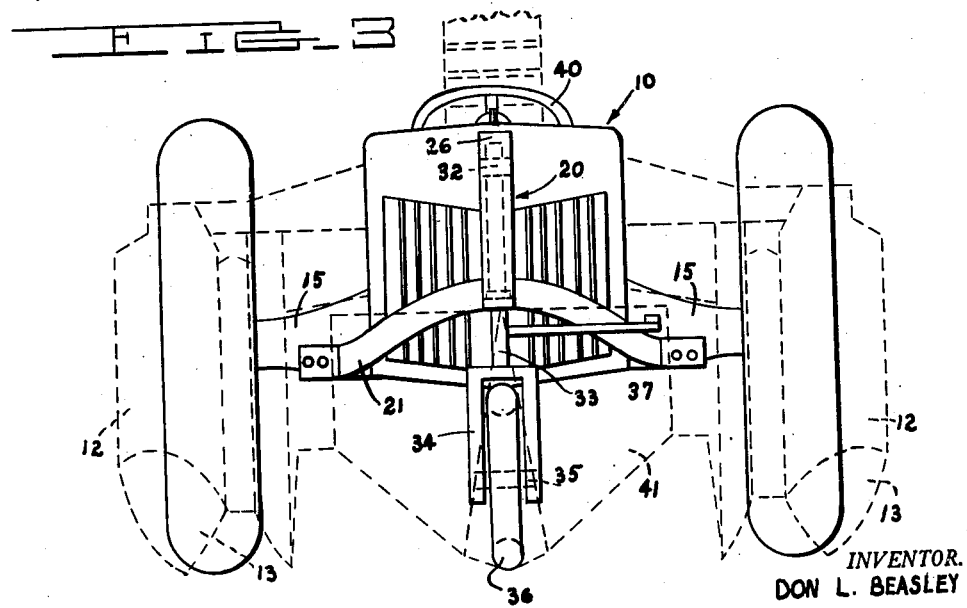
Figure 3 is a front end view of the tractor of Figure 1.

Reference numeral 10 refers generally to a tractor having mounted thereon an implement 11 which may take the form of a two-row mounted corn picker. The picker 11 is provided with forwardly extending flare sheets 12 terminating in snouts 13. The picker is preferably rigidly mounted upon the tractor with the flare sheets on opposing sides thereof being joined, as by a cross bar 14, rigid with the tractor and also rigidly mounted on the tractor rear axle 15.

An elevating and steering assembly 20 of the present invention is provided at the forward end of the tractor 10, the assembly 20 including a pair of rearwardly divergent rigid bracket arms 21 extending downwardly and rearwardly and terminating in outturned portions 22 in flush surface engagement with the outermost portions 23 of the conventional tractor front axle 24. The bracket arms 21 are secured to the tractor front axle 24 by suitable means, as by bolts 25. The tractor 10 as conventionally utilized is provided with a pair of laterally spaced steerable front wheels carried by sub-axles normally bolted to the fixed front axle 24 and, upon removal of the sub-axles, the bracket arms 21 may be installed on the axle.

The bracket arms 21 carry at their free forwardly convergent ends an upstanding hydraulic cylinder 26, preferably of the single acting type having a pressure fluid connection 27 adjacent its upper end connected to an hydraulic line 28 extending rearwardly therefrom for connection, as at 29, to the reservoir of the conventional tractor-mounted and tractor-actuated hydraulic system. Actuation of the cylinder by the hydraulic system is controlled through the conventional hydraulic control lever 30 mounted adjacent the tractor operator's seat 31.

The cylinder 26 is provided with a movable piston 32 carrying an actuating rod 33 extending axially of the cylinder and projecting therebeyond to carry at its free lower end a wheel yoke 34. The U-shaped yoke 34 carries a tractor front wheel 36. The tractor front wheel 36 is thus carried by the actuating rod 33 for vertical movement therewith, and the wheel is steered by means of a laterally extending steering arm 37 pivotally connected to the tractor drag links 38, which in turn are connected to the left hand steering pitman arm 39 so as to be pivotal with response to returning movement of the steering wheel 40.

It will be readily appreciated that steering movement of the wheel 36 is effected by rotation of the cylinder actuating rod 33 and such turning movement is accommodated by the rod-piston connection. Further, the steering arm 37 is connected to the actuating rod 33 well beneath the cylinder 26 so that steering is accomplished with ease at any vertically adjusted position of the wheel relative to the tractor. Actuation of the piston is accomplished through the well-known tractor hydraulic system which is actuatable in response to movement of the control lever 30.

Upon vertical movement of the wheel as a consequence of actuation of the piston 32, the front end of the tractor will be adjusted vertically by pivoting movement of the tractor frame about the rear axle 15. Such pivoting movement may be readily accomplished through the tractor differential. Further, such vertical movement of the tractor front end will result in adjustment of the rigidly mounted implement 11 relative to the ground, such adjustment being desirable to vary the distance of the snouts 13 and the front wheel shield 41 for greater picking efficiency.

It will be appreciated that the elevation of one end of the tractor may be utilized to control the vertical position of many implements other than the illustrated corn picker. For example, the present invention may be utilized to control the positioning of a mounted cultivator, a mounted planter, or a mounted stalk shredder, as well as other implements too numerous to mention. Also, the non-driving or steering wheel may be located at the rear of the tractor, in which case the rear end may be elevated or lowered by the power means. Another advantage of the present invention resides in the possibility of simplifying tractor-mounted implements and the connection of such implements to the tractor, inasmuch as a rigid tractor-implement connection may be employed and there is no necessity for pivoting the implement relative to the tractor. An inexpensive single acting cylinder may be used for power shifting the wheel in only one direction, i. e., downwardly, since the weight of the tractor will force the wheel upwardly when the hydraulic pressure is relieved. Also vertical adjustment may be attained and retained through the conventional tractor hydraulic mechanism.

It will, of course, be understood that various details of construction may be varied through a wide range without departing from the principles of this invention and it is, therefore, not the purpose to limit the patent granted hereon otherwise than necessitated by the scope of the appended claim.

I claim:

A single front wheel conversion unit for tractors of the type having a laterally projecting front axle frame and an engine driven hydraulic system, comprising a support bracket having a pair of rearwardly divergent arm portions respectively adapted to abut the outermost portions of said front axle frame, means for rigidly securing said arm portions to said front axle frame, an hydraulic cylinder mounted centrally on said support bracket in vertical position, a piston in said cylinder, a piston rod projecting downwardly from said cylinder, a wheel mounting yoke secured to the end of said piston rod, means for supplying hydraulic fluid to said cylinder from the tractor hydraulic system, whereby the effective height of the tractor front end is selectively controlled, and means for angularly shifting said wheel mounting yoke relative to said support bracket, thereby steering the tractor.

References Cited in the file of this patent

UNITED STATES PATENTS

| Number | Name | Date |
|---|---|---|
| 1,258,362 | Rupprecht | Mar. 5, 1918 |
| 2,214,979 | Thiemann | Sept. 17, 1940 |
| 2,314,041 | Gurries | Mar. 16, 1943 |
| 2,450,015 | Odegaard | Sept. 28, 1948 |
| 2,568,445 | Grattan | Sept. 18, 1951 |